US009258186B2

(12) United States Patent
Negron et al.

(10) Patent No.: US 9,258,186 B2
(45) Date of Patent: *Feb. 9, 2016

(54) SYSTEM AND METHOD FOR CONFIGURATION OF NETWORK-CAPABLE APPLIANCES

(71) Applicant: UNIVERSAL ELECTRONICS INC., Santa Ana, CA (US)

(72) Inventors: Eric Negron, San Francisco, CA (US); Patrick H. Hayes, Mission Viejo, CA (US)

(73) Assignee: Universal Electronics Inc., Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/533,792

(22) Filed: Nov. 5, 2014

(65) Prior Publication Data

US 2015/0058458 A1 Feb. 26, 2015

Related U.S. Application Data

(63) Continuation of application No. 13/774,047, filed on Feb. 22, 2013, now Pat. No. 8,929,351, which is a continuation of application No. 13/440,607, filed on Apr. 5, 2012, now Pat. No. 8,385,304, which is a continuation of application No. 11/823,737, filed on Jun. 28, 2007, now Pat. No. 8,254,352.

(51) Int. Cl.
| | |
|---|---|
| H04L 12/24 | (2006.01) |
| H04W 84/12 | (2009.01) |
| H04L 12/28 | (2006.01) |
| H04N 21/422 | (2011.01) |
| H04N 21/81 | (2011.01) |
| H04N 5/44 | (2011.01) |

(52) U.S. Cl.
CPC ........ *H04L 41/0813* (2013.01); *H04L 12/2807* (2013.01); *H04L 41/5054* (2013.01); *H04L 41/5067* (2013.01); *H04N 21/42221* (2013.01); *H04N 21/42225* (2013.01); *H04N 21/42226* (2013.01); *H04N 21/8186* (2013.01); *H04W 84/12* (2013.01); *H04L 2012/2849* (2013.01); *H04N 2005/4435* (2013.01)

(58) Field of Classification Search
None
See application file for complete search history.

(56) References Cited

U.S. PATENT DOCUMENTS

| | | | | |
|---|---|---|---|---|
| 6,211,870 | B1 * | 4/2001 | Foster ........................... | 715/744 |
| 7,224,903 | B2 * | 5/2007 | Colmenarez et al. ......... | 398/106 |
| 7,548,246 | B2 * | 6/2009 | Huang et al. .................. | 345/600 |
| 8,254,352 | B2 * | 8/2012 | Negron et al. ................ | 370/338 |
| 8,385,304 | B2 * | 2/2013 | Negron et al. ................ | 370/338 |
| 8,929,351 | B2 * | 1/2015 | Negron et al. ................ | 370/338 |
| 2003/0103088 | A1 * | 6/2003 | Dresti et al. ................... | 345/835 |
| 2004/0203590 | A1 * | 10/2004 | Shteyn .......................... | 455/410 |
| 2004/0249925 | A1 * | 12/2004 | Jeon et al. ...................... | 709/223 |
| 2005/0043019 | A1 * | 2/2005 | Nakamura et al. ............ | 455/418 |
| 2005/0068222 | A1 * | 3/2005 | Krzyzanowski et al. ..... | 341/176 |

(Continued)

*Primary Examiner* — Brian Roberts
(74) *Attorney, Agent, or Firm* — Greenberg, Traurig, LLP

(57) ABSTRACT

A controlling device is used to configure a target device for wireless network communications through use of a setup wizard. The setup wizard is used to obtain information required to perform communications on a wireless network via a wireless network router and a digital representation of the information obtained through use of the setup wizard is provided to the target device via use of the controlling device. The target device will use the digital representation of the information to configure itself for wireless network communications.

13 Claims, 5 Drawing Sheets

(56) References Cited

U.S. PATENT DOCUMENTS

| | | |
|---|---|---|
| 2005/0138193 A1* | 6/2005 | Encarnacion et al. ........ 709/230 |
| 2005/0148326 A1* | 7/2005 | Nogawa et al. ............... 455/420 |
| 2005/0156712 A1* | 7/2005 | Jyrinki .................... 340/286.01 |
| 2005/0221858 A1* | 10/2005 | Hoddie ........................ 455/557 |
| 2006/0126537 A1* | 6/2006 | Booth ........................... 370/255 |
| 2006/0282541 A1* | 12/2006 | Hiroki ........................... 709/228 |
| 2007/0050615 A1* | 3/2007 | Xu et al. ....................... 713/151 |
| 2007/0052549 A1* | 3/2007 | Le ............................ 340/825.72 |
| 2007/0061575 A1* | 3/2007 | Bennett ........................ 713/171 |
| 2007/0106764 A1* | 5/2007 | Mansfield ..................... 709/220 |

* cited by examiner

SYSTEM AND METHOD FOR CONFIGURATION OF NETWORK-CAPABLE APPLIANCES

RELATED APPLICATION INFORMATION

This application claims the benefit of and is a continuation of U.S. application Ser. No. 13/774,047, filed on Feb. 22, 2013, which application claims the benefit of and is a continuation of U.S. application Ser. No. 13/440,607, filed on Apr. 5, 2012, which application claims the benefit of and is a continuation of U.S. application Ser. No. 11/823,737, filed on Jun. 28, 2007, which applications are incorporated herein by reference in their entirety.

BACKGROUND

Expanded use of wireless networking in the home, coupled with the broad availability of a variety of consumer media content in digital form has resulted in an increasing number of consumer appliances being offered with standard or optional wireless networking capability. Such appliances may include, for example, A/V receivers, digital picture frames, Internet radios, network music players, etc. An example of such a network is illustrated in FIG. 1.

Initial configuration of these appliances for operation on a user's network (most commonly a so-called Wi-Fi network based on the IEEE 802.11 family of standards) can however be tedious and frustrating. The limited GUI and interface (remote control and/or panel buttons) of such appliances is not well suited to this task, which usually requires the entry of alphanumeric data such as network ID, encryption keys and passwords, etc. For example, in a secure Wi-Fi network this may include at a minimum a network name (SSID) and a Wired Equivalent Protocol (WEP) or Wi-Fi Protected Access (WPA) password. It should be noted that while for convenience Wi-Fi terminology may be used throughout the balance of this document, the techniques and methods described are not intended to be limited to Wi-Fi networks only.

Several approaches have been taken or proposed at various times to overcome this initial configuration issue. When performed on the appliance itself, setup and configuration generally uses the controlling device or front panel buttons to either scroll through an alphabet (e.g., channel up and down) or alternatively to perform multi-stroke character entry using the numeric pad as is well known in the cellular phone environment. Other approaches involve bringing the appliance into the proximity of an existing network device and either physically connecting it via a cable or initiating some form of near field communication (e.g., RFID) to authenticate the new appliance being introduced. Another approach proposed by the Wi-Fi Alliance utilizes a unique "PIN" which is factory programmed into each appliance and also printed on an external sticker placed on the appliance, its manual, and/or its packaging. A user enters this PIN value into some other already connected network device to authenticate the new appliance. Yet another approach exemplified by Microsoft's "Wireless Connect Now" feature of Windows XP SP2 proposes the use of a "memory stick" or USB flash drive to transfer settings data from a network-connected personal computer to the new appliance.

SUMMARY OF THE INVENTION

A common feature of most of the appliances to be configured is the provision with the appliance of a controlling device, for example an infrared or RF remote control. A configuration method is disclosed which leverages the controlling device which is inherently part of a target AV appliance by utilizing the controlling device to transfer network and other configuration information from a personal computer (PC) to the appliance with which the controlling device is associated. To this end, the personal computer, which would include a full QWERTY keyboard, is conveniently utilized to initially enter network configuration information, typically under the guidance of a setup wizard. By way of example, the PC based setup wizard may be provided for facilitating the installation and configuration of a networked appliance of the type listed above and, when invoked, this setup wizard may serve to guide a user through the gathering of all parameters necessary for configuration of the appliance. It is anticipated that in cases where the PC upon which the wizard is executing is also destined to be a host server for digital media content to be delivered to the appliance, certain parameters (e.g., SSID) may be automatically obtained by the setup wizard without user intervention. Furthermore, the network configuration portion of the setup wizard may comprise part of a larger setup wizard which also accomplishes the installation and configuration of the media server features of the PC. In such cases, additional non-network appliance configuration information (e.g., name of directories in which content is stored, playlist locations, user preferences, etc.) may also be gathered and stored by the setup wizard for later transfer to the appliance as described hereafter. Additionally, in certain embodiments the setup wizard may serve to configure various features of the controlling device supplied with the appliance.

A better understanding of the objects, advantages, features, properties and relationships of the systems and methods described hereinafter will be obtained from the following detailed description and accompanying drawings which set forth illustrative embodiments and which are indicative of the various ways in which the subject systems and methods may be employed.

BRIEF DESCRIPTION OF THE DRAWINGS

For a better understanding of the systems and methods for configuration of network-capable appliances hereinafter described, reference may be had to preferred embodiments shown in the attached drawings in which.

DETAILED DESCRIPTION

Figure 1:
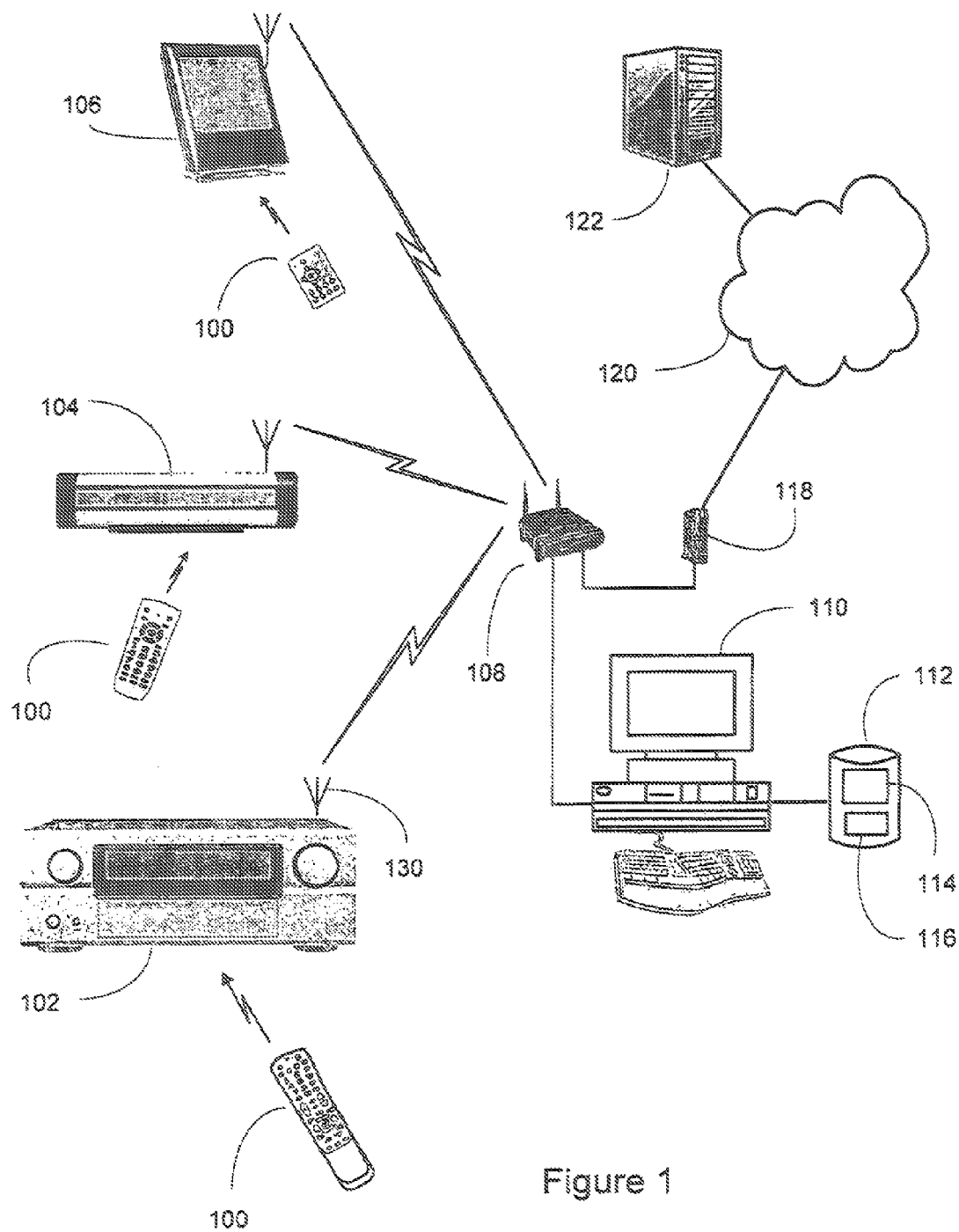
FIG. 1 illustrates an exemplary system in which a described appliance configuration method may be practiced.

Turning now to FIG. 1, there is illustrated an exemplary system in which a controlling device may be used to provide appliance configuration. A local area device network (LAN) comprising a PC 110, digital picture frame 106, digital music renderer 104 and a to-be-introduced into the network AV receiver 102 is supported by a combination router/WAP/Ethernet switch 108. PC 110 is interfaced to router 108 via a wired Ethernet port, while the other appliances 102,104,106 utilize wireless connections (e.g., Wi-Fi) to router 108. A wide area network (WAN) connection device 118 (e.g., a cable modem, DSL adapter, etc.) is attached to another of the wired Ethernet ports of router 108, providing access by the LAN and its devices to the Internet or similar network 120. It will be appreciated that many other permutations of local area networking equipment and appliances are possible and as such the network illustrated in FIG. 1 is by way of example only and not intended to be limiting as to the scope of the inventive method. Besides supporting classical personal computing applications, PC 110 may also act as a media server, i.e., its mass storage 112 may include a repository of digital content 114 (e.g. music, pictures, video, etc.) suitable for rendering by appliances 102, 104, 106. Additional content may also be available via the Internet 120 from remotely-located servers 122.

Each of the appliances 102, 104, 106 may be provided with a suitable controlling device 100. As is known in the art, the controlling devices 100 may be capable of transmitting commands to the appliances using any convenient IR, RF, point-to-point, or networked protocol to cause the appliances to perform operational functions. Further, some or all of the controlling devices 100 may be of the "universal" type, i.e., a controlling device that is capable of controlling other appliances in addition to the one with which they were originally supplied. Thus, while illustrated in the context of an AV receiver 102, a digital music renderer 104, and a digital picture frame 106, it is to be understood that controllable appliances may also include, but are not limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc., and various combinations thereof.

Figure 2:
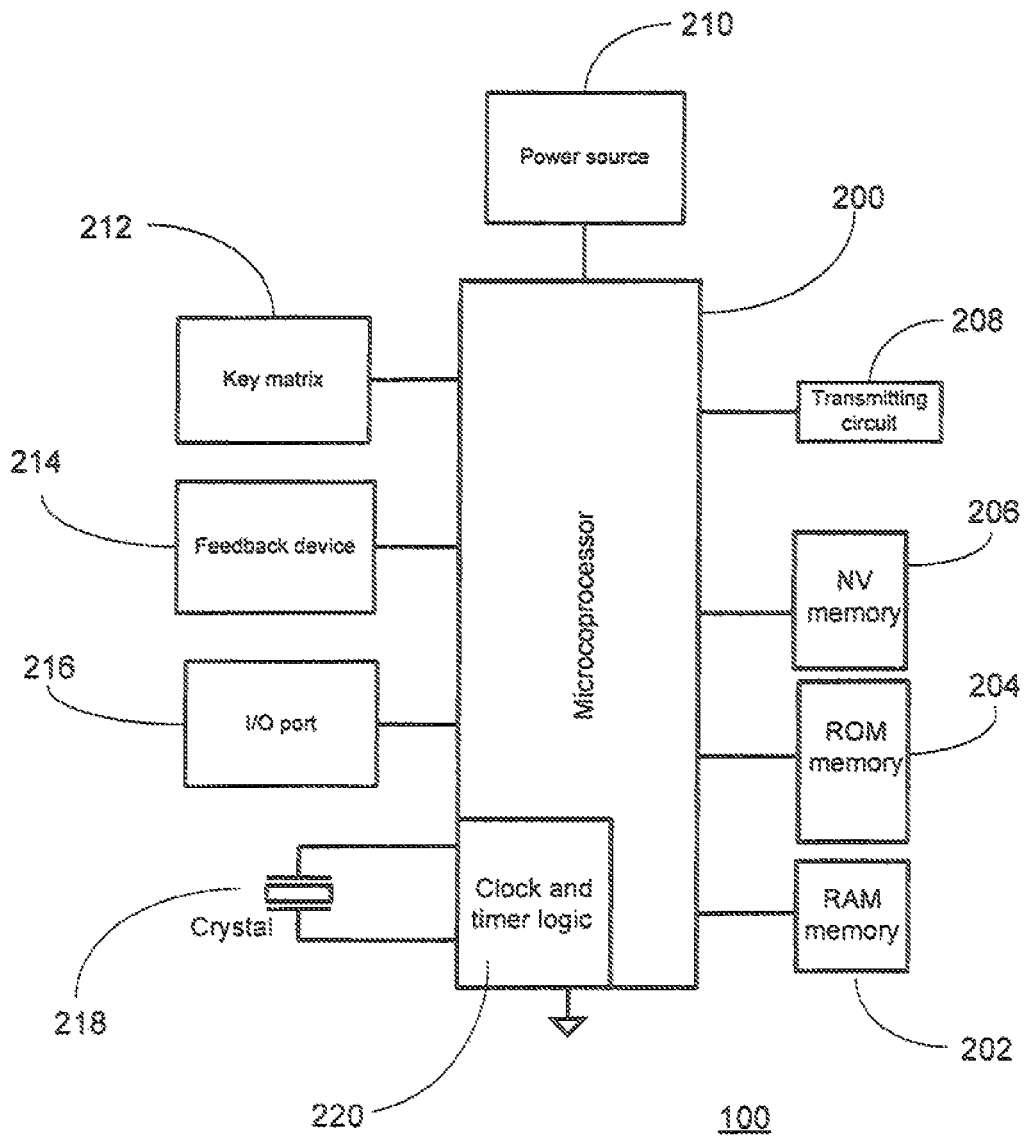
FIG. 2 illustrates a block diagram of components of an exemplary controlling device for use in the system of FIG. 1.

With reference to FIG. 2, for use in commanding the functional operations of one or more appliances, a controlling device 100 may include, as needed for a particular application, a processor 200 coupled to a ROM memory 204, a RAM memory 202, a key matrix 212 (e.g., hard keys, soft keys such as a touch sensitive surface overlaid on a liquid crystal (LCD) or an electroluminescent (EL) display, or some combination thereof), transmission circuit(s) 208 and/or transceiver circuit(s) (e.g., wireless IR and/or RF), a non-volatile read/write memory 206, a means 214 to provide feedback to the user (e.g., one or more LEDs, LCD display, speaker, and/or the like), a power source 210, an input/output port 216 such as a serial interface, modem, Zigbee, WiFi, or Bluetooth transceiver, USB port, etc., and clock and timer logic 220 with associated crystal or resonator 218.

As will be understood by those skilled in the art, some or all of the memories 202, 204, 206 may include executable instructions (collectively, the program memory) that are intended to be executed by the processor 200 to control the operation of the controlling device 100, as well as data that serves to define the aforementioned control protocols and command values to the operational software (collectively, the command data). In this manner, the processor 200 may be programmed to control the various electronic components within the controlling device 100, e.g., to monitor the power supply 210, to cause the transmission of signals, control visual feedback device(s) 214, etc. All or part of the non-volatile read/write memory 206, for example an EEPROM, battery-backed up RAM, FLASH, Smart Card, memory stick, or the like, may additionally be used to store controlling device setup data and parameters as necessary. Further, a portion of RAM memory 202 and/or non-volatile memory 206 may be used for the storage of network setup and other data to be transferred to appliances such as 102, 104 and/or 106 as will be described in more detail hereinafter. While the memory 204 is illustrated and described as a ROM memory, memory 204 may also be comprised of any type of readable media, such as ROM, FLASH, EEPROM, or the like. Preferably, the memories 204 and 206 are non-volatile or battery-backed such that data is not required to be reloaded after battery changes. In addition, the memories 202, 204 and 206 may take the form of a chip, a hard disk, a magnetic disk, an optical disk, and/or the like. Still further, it will be appreciated that some or all of the illustrated memory devices may be physically incorporated within the same IC chip as the microprocessor 200 (a so called "microcontroller") and, as such, they are shown separately in FIG. 2 only for the sake of clarity.

To cause the controlling device 100 to perform an action, controlling device 100 is adapted to be responsive to events, such as a sensed user interaction with the key matrix 212, etc. In response to an event, appropriate instructions within the program memory (hereafter the "operating program") may be executed. For example, when a function key is actuated on the controlling device 100, the controlling device 100 may retrieve from the command data the command value and control protocol corresponding to the actuated function key and the current device mode of the controlling device 100, stored within memory 202, 204, and/or 206, and transmit a command to a target appliance with which controlling device 100 was supplied, e.g. the AV receiver 102, in a format recognizable by that target appliance. In an exemplary embodiment, the operating program may also be operable to transmit a previously stored block(s) of configuration data to the target appliance as will be described in more detail hereafter. It will be further appreciated that the operating program can be used not only to cause the transmission of command codes and/or data to the appliances, but also to perform local operations. While not limiting, local operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092.

As noted previously, controlling device 100 may be what is commonly referred to as a "universal" type controlling device, i.e., a controlling device that is provided with a library of command data representative of multiple different device control protocols, thereby enabling a user of said controlling device to operate additional appliances other than the one with which the controlling device was originally supplied. For example a universal controlling device supplied with an AV receiver may for user convenience also be capable of operating the user's TV set and/or DVD players regardless of the make or model of those appliances. In such embodiments, the library of command data may be pre-programmed into the memory 202, 204, and/or 206 of controlling device 100; may be stored externally, either locally 116 on a personal computer 110 or remotely on a web server 122 and downloaded into controlling device 100 as required; or some combination thereof. Methods for setting up a controlling device to command the operation of specific home appliances by selection of a particular command set from a library of command codes, and if necessary downloading such code set into the controlling device for example via external input port 216, are well-known and will not be described in greater detail herein. Nevertheless, for additional information pertaining to setup procedures, the reader may turn to, by way of example, U.S. Pat. Nos. 6,587,067, 5,614,906, 6,225,938, 7,046,161 and 7,218,243. It will also be appreciated that the controlling device 100 may be set up to command an appliance by being taught the command codes needed to command such appliance as described in U.S. Pat. No. 4,623,887.

In the example illustrated in FIG. 1, an AV receiver 102, which is equipped with a wireless networking interface 130 and which has the capability of accessing and playing back digital audio content from a networked server such as, for example, content 114 when PC 110 is configured as a media server, is to be configured for use within the network. In order to facilitate configuration of AV receiver 102 during initial installation, a PC application may be provided in conjunction with AV receiver 102 (e.g., on a CD ROM, memory stick, etc. packaged with it, or alternatively downloadable from a Web site). This PC application comprises a setup wizard which, once installed on a user's PC 110, will guide that user through a series of steps to acquire the information necessary to configure AV receiver 102 for networked operation. Additionally, in certain embodiments the setup wizard may also guide the user through the setup of a universal remote control 100 that is supplied with AV receiver 102 and/or the installation and configuration of media sever software on PC 110 as needed to support content playback on AV receiver 102.

Figure 3:
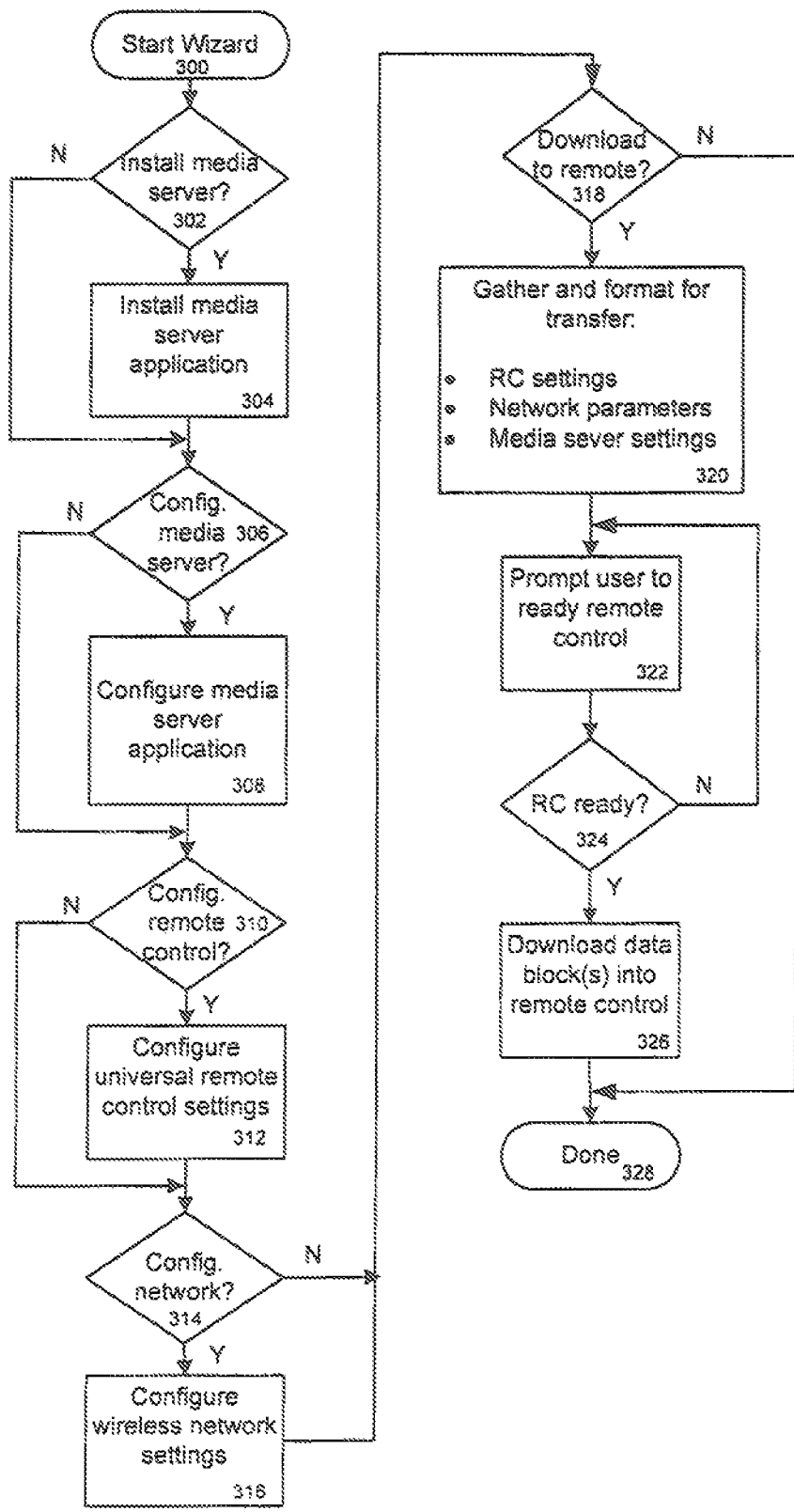
FIG. 3 illustrates in flowchart form an exemplary series of steps to acquire and load networked appliance configuration data into a controlling device.

By way of more detailed explanation and with reference to FIG. 3, upon being invoked 300, the setup wizard may query whether the media server application is to be installed 302. If so, at step 304 the appropriate software files will be copied and/or extracted from the installation CD ROM or downloaded from a server computer (e.g., downloaded as a file compressed in "Zip" format) and placed in the program file area of PC 110. As is known in the art, such installation may include entry of information into system registries, start up folders, etc., as required by the particular operating system of PC 110. Upon completion of installation, the setup wizard may then query 306 whether the media server application is to be configured. If so, at step 308 configuration data such as directories in which content is stored, access permissions, playlist information, etc. may be gathered from the user. This may also comprise locating, sorting, indexing, etc. content stored locally on PC 110 and/or remotely on other networked devices. Such media server setup activities are well known in the art, however, for further information regarding such setup activities reference may be made to, for example, co-pending U.S. patent application Ser. No. 11/131,088 of like assignee and incorporated herein by reference in its entirety. Upon completion of this step, certain data items may be stored on PC 110 (or retrievable via PC 110) for later transfer to AV receiver 102 as will be described hereafter.

Following media server configuration, the setup wizard may query 310 whether the universal remote control 100 supplied with AV receiver 102 is to be set up. If so, at step 312 information pertinent to the setup of universal remote control 100 may be gathered from the user. Such information may include, for example, brand and model number(s) of other items of equipment to be controlled through use of the universal remote control 100, which of these devices are attached to which inputs on AV receiver 102, etc. Such information may be distilled into appropriate IR or RF command sets, macro sequences, etc., either locally by the setup wizard itself or interactively in conjunction a Web service 122, or a combination thereof, as further described in, for example, the before referenced U.S. Pat. Nos. 7,146,161 and 7,218,243, or in pending U.S. patent application Ser. Nos. 09/615,473 or 09/804,623 all of which are incorporated herein by reference in their entirety. Upon completion, all required remote control setup information and/or command code sets may stored on PC 110 in a format suitable for later transfer to remote control 100 as will be described hereafter.

Following remote control configuration, the setup wizard may query 314 whether the network settings for AV receiver 102 are to be configured. If so, at step 316 the setup wizard will acquire the necessary parameters from the user and/or the internal network settings of PC 110. Such data may include SSID, WPA or WEP password(s), etc. Once acquired, this information may be saved for later transfer to AV receiver 102 via remote control 100 as will be described hereafter.

Figure 4:
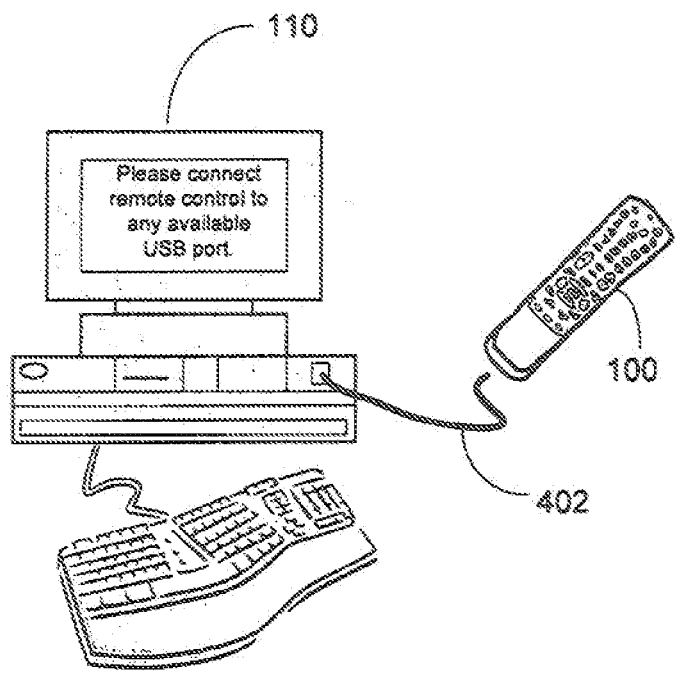
FIG. 4 illustrates a method for the transfer of networked appliance configuration data into a controlling device.

Upon the user's completion of all desired configuration steps, the setup wizard may query 318 whether the user is ready to transfer the saved data to remote control 100. If a negative response is received, the setup wizard is complete and the parameters and values saved during the process are retained for future editing and/or transfer to remote control 100 and AV receiver 102. If a positive response is received, at step 320 the saved parameters and configuration settings are formatted for download into remote control 100. The data to be downloaded may be divided into multiple segments or blocks for convenience of processing by the operating program of remote control 100. For example remote control setup values gathered at step 312 may be formatted into a separate data block from AV receiver configuration parameters gathered at steps 316 and/or 308. In this manner each individual download block may be separately provided with a checksum, be encrypted, etc., as desired. Once all the data to be transferred to remote control 100 is formatted for download, at step 322 the user may be prompted to ready remote control 100 for transfer of data from PC 100. To this end, remote control 100 may be attached to PC 110 via a wired connection, for example a USB cable 402 as illustrated in FIG. 4. It will be appreciated, however, that the physical transfer of data between the PC 110 and a controlling device need not be limited to a wired connection as illustrated, rather various alternative embodiments may use audible, optical (e.g., as described in U.S. Pat. Nos. 5,922,058 or 6,256,378), magnetic (e.g., as described in U.S. Pat. No. 5,537,463), infrared (e.g., IrDA), RF (e.g., Bluetooth) or any other suitable coupling method to achieve the same end. Regardless of method used, once the remote control 100 of the exemplary embodiment has been readied 324 for reception of data from PC 110, at step 326 the data gathered by the setup wizard is transferred to remote control 110 and the setup wizard completes at step 328.

Figure 5:
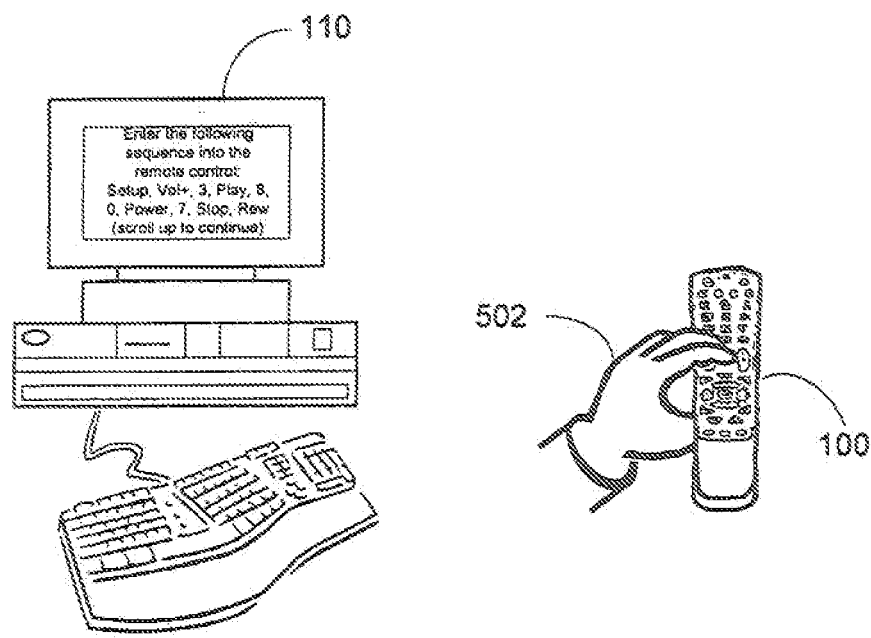
FIG. 5 illustrates a further method for the transfer of networked appliance configuration data into a controlling device.

In an instance in which a controlling device does not include any capability for communication with a PC, upon completion of configuration data acquisition the setup wizard may display a key entry sequence to the user whereby the user may actuate corresponding keys of the controlling device to manually enter 502 into the controlling device the configuration data as is illustrated in FIG. 5. It will be understood that the data to be transferred may be encoded so as to minimize the number of keystrokes required, e.g., by using all the keys available on the keypad of the controlling device. For example, if the controlling device has at least 32 keys, duotrigesimal (base 32) encoding may be utilized.

It will be appreciated that the exact sequence and order of the above described setup activities is not material to the practice of the inventive method, rather these may be conducted in any convenient order, individual steps may be omitted, etc. as appropriate to a given circumstance. Furthermore any or all of these steps may be performed with the controlling device already in communication with the PC, in which case data may be formatted and transferred immediately as it is gathered during use of the setup wizard rather than saved for later download.

Upon completion of data transfer to the controlling device, the operating program of the controlling device may immediately act upon that portion of the transferred data which is applicable to configuration of the controlling device itself, e.g., selection of command set(s) corresponding to devices to be controlled, key assignment across devices, storage of macro sequences, etc., all as are well known in the art previously referenced. In the illustrated example, the additional portion of the downloaded data destined for AV receiver 102 is stored within the memory 202 and/or 206 of remote control 100 for later transfer to AV receiver 102 once remote control 100 has been transported by a user to the vicinity of the appliance and a transfer mode initiated, as will now be described in further detail.

Figure 6:
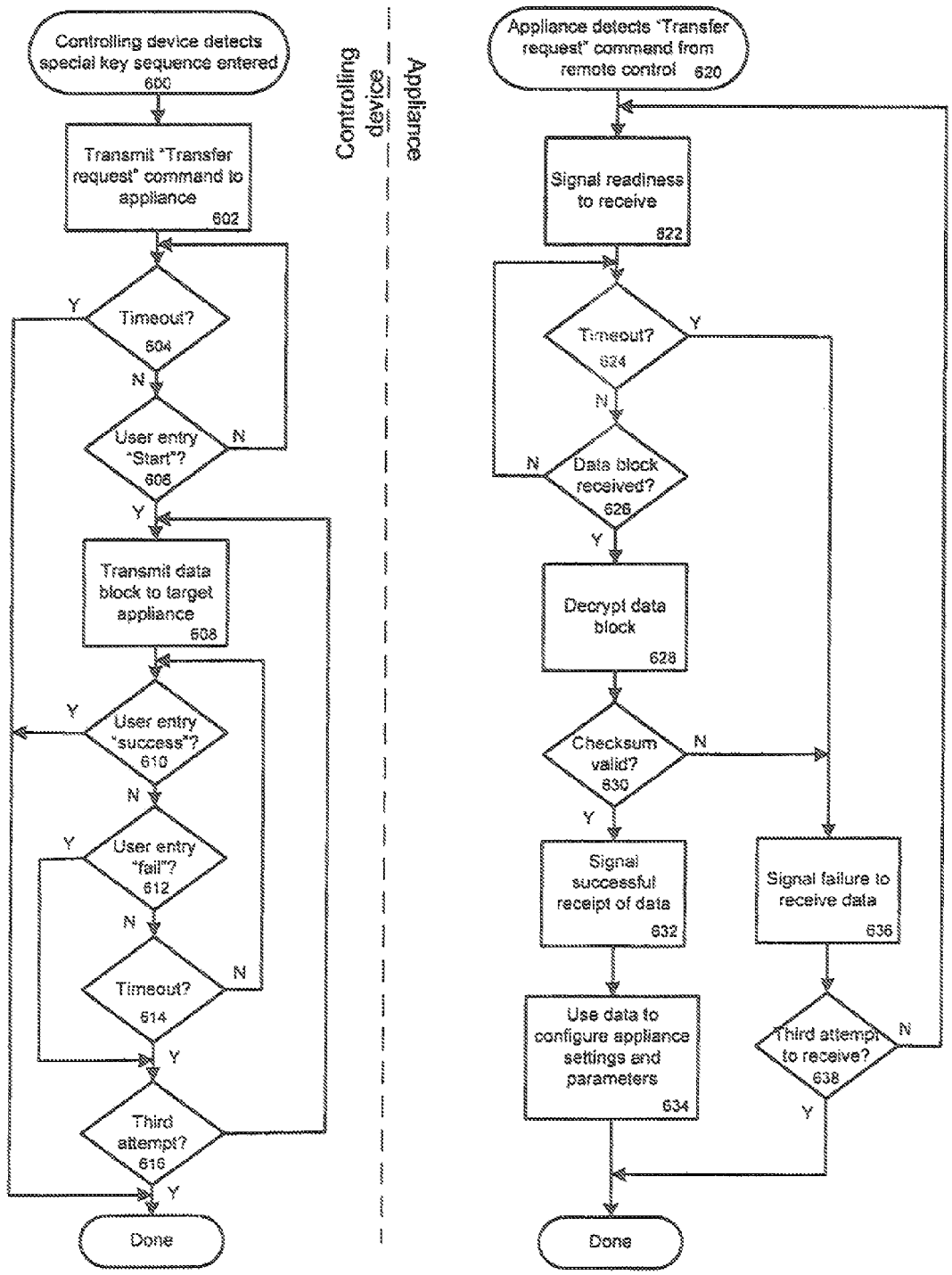
FIG. 6 illustrates in flowchart form an exemplary series of steps to transfer configuration data from a controlling device to a networked appliance.

Turning now to FIG. 6, there is illustrated an exemplary method by which configuration data stored in a controlling device such as remote control 100 may be transferred to a target appliance such as AV receiver 102, utilizing the conventional unidirectional IR or RF link hardware provided for transmission and receipt of control functions. Initially the controlling device may be placed into a data transfer mode 600 by the user, for example by the entry of a unique key sequence or combination of keys (e.g., holding down "mute" and "play" together for several seconds; entering a special device code number; etc.). When placed into this mode, at step 602 the controlling device may transmit a specially defined "transfer request" command code to the target appliance. Upon receiving the "transfer request" command at step 620, the appliance may prepare itself for the transfer of configuration data block(s) from the controlling device. When the appliance is ready to receive the data from the controlling device, at step 622 the appliance may signal the user, for example via a message or icon on its front panel, via a display on an attached device such as a TV set, via a sound, etc. The appliance may then wait to receive a data block from the controlling device, as shown at steps 624 and 626.

Upon observing that the appliance is ready to receive the network configuration data, at step 606 the user may provide a start indication to the controlling device, such as for example pressing a key on remote control 100. If the controlling device does not receive such an indication within a reasonable period of time, it may time out and exit the data transfer mode as shown at step 604. Once the start indication is provided, at step 608 the controlling device may transmit the stored portion of the network configuration data which was previously transferred into the controlling device as described earlier. In an alternative embodiment, transmission of the data may commence automatically a predetermined period of time after the transfer request command has been issued, i.e., omitting steps 622, 604, and 606. Methods for encoding the network configuration data on the physical transmission medium (e.g., wireless IR or RF) are well known in the art and will not be described in further detail herein, however, for additional insight reference may be made to U.S. Pat. No. 6,781,518 of like assignee and incorporated hereby in its entirety. Preferably, the information to be transferred to the appliance is protected against data corruption during transmission by a checksum, hash function, or similar mechanism as is well known in the art. For ease of transfer, large data blocks may be broken down into multiple transmission segments and reassembled at the targeted receiver. Furthermore, the data may be encrypted (especially in cases where communication between the controlling device and the appliance is by means of an RF signal) in order to protect configuration data values such as SSID or WEP password from interception or eavesdropping. Encryption may be performed by the setup wizard prior to transferring the data to the controlling device, or may be performed within the controlling device itself immediately prior to transmission to the appliance. In either case any suitable encryption method may be used, however, since this type of communication between the controlling device and the appliance is likely to be of short duration and infrequent occurrence, in some cases a single fixed encryption key, factory encoded into the appliance and either its corresponding controlling device or setup wizard software, may suffice. Alternatively an encryption key value may be factory encoded both within the appliance and on a label attached to it, in which instance a user wishing to transfer configuration data may be required to enter the label value into the controlling device for retention in non-volatile memory 206 or into the PC for storage and use by the setup wizard application. Other methods, for example using a random numeric sequence entered by the user on the controlling device keypad and repeated on the front panel of the appliance may also be used.

Once the data block(s) have been received by the appliance at step 626 (and reassembled, if necessary) at steps 628 and 630 the data is decrypted and checked for integrity. It will be appreciated that in certain instances these steps may be performed in a different order, depending upon whether the checksum and/or hash values are inside or outside the encrypted portion, or both. If the checksum calculation fails (step 630), or if a complete data block is not received with a reasonable time (step 624), the appliance may signal the user at step 636 that the data transmission attempt has failed. At step 638, if there have not been too many previous attempts, the appliance may return to the receive ready state starting at step 622 in order to reattempt the data transfer. If the received data is validated, the appliance may signal this fact to the user at step 632, and then at step 634 may apply the received data to configure itself for the network.

On completion of transmission to the appliance, the controlling device may wait at steps 610 through 614 for a user input based on the indication presented by the appliance at step 632 or 636, e.g., user activation of an "up" or "down" key on remote control 100. If no input or a negative input is received, at step 616 the controlling device will initiate a re-transmission of the data block(s), provided there have not been to many previous attempts.

It will be appreciated that in instances in which the controlling device is capable of bi-directional communication with the target appliance, certain of the above described steps may performed automatically using direct communication between the target appliance and controlling device and without user involvement, for example, the user involved steps 622, 606, 636, 610, and 612. Such bi-directional communication may use any convenient IR or RF format, again as are well known in the art, however, for additional insight reference may be made to U.S. Pat. No. 7,167,913 of like assignee and incorporated herein by reference in its entirety.

While various concepts have been described in detail, it will be appreciated by those skilled in the art that various modifications and alternatives to those concepts could be developed in light of the overall teachings of the disclosure. For example, while described in the context of a hand-held remote control being utilized as the controlling device, the controlling device may be any device that includes the ability to control operational functions of another device. Additionally, while the above described system and methods have been discussed in the context of communicating SSID, WEP, WPA, and other network setup and security data from a server to a client device, other types of data such as Digital Rights Management ("DRM") or other content security keys, user protected content source password and/or key information, and other data types and formats may be effectively and securely transferred using the system and methods described herein. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A smart device having a memory in which is stored instruction which, when executed by a processing device of the smart device, assist in configuring a first device for wireless network communications with a second device, the instructions performing steps comprising:

receiving by a first receiving system of the smart device via a first communications link a first communication from the second device, the first communication comprising a data representative of a first information required to exchange communications with the second device via a second communications link and a data representative of a second information required to at least issue communications to the first device via a third communications link;

using the second information to configure a transmission system of the smart device to issue communications to the first device via the third communications link; and causing the configured transmission system of the smart device to issue a second communication to the first device via the third communications link, the second communication comprising the data representative of the first information required to exchange communications with the second device via the second communications link whereupon the first device will use the first information required to exchange communications with the second device to configure itself to exchange communications with the second device via the second communications link.

2. The smart device as recited in claim 1, wherein the first communications link comprises a wired communications link, the second communications link comprises a first wireless communications link, and the third communications link comprises a second wireless communications link.

3. The smart device as recited in claim 2, wherein the second communications link comprises a radio frequency communications link and the third communications link comprises an infrared communications link.

4. The smart device as recited in claim 1, wherein the first communications link comprises a first wireless communications link, the second communications link comprises a second wireless communications link, and the third communications link comprises a third wireless communications link.

5. The smart device as recited in claim 4, wherein the second communications link comprises a radio frequency communications link and the third communications link comprises an infrared communications link.

6. The smart device as recited in claim 1, wherein the second information comprises data indicative of a communications protocol recognizable by the first device.

7. The smart device as recited in claim 1, wherein the first information comprises data representative of at least a network name and a network password.

8. The smart device as recited in claim 1, wherein the configured transmission system of the smart device is caused to issue the second communication to the first device via the third communications link in response to an activation of an input element of the smart device.

9. The smart device as recited in claim 1, wherein the instructions receive by a second receiving system of the smart device via the third communications link a third communication from the first device and wherein the configured transmission system of the smart device is caused to issue the second communication to the first device via the third communications link in response to the second receiving system of the smart device receiving the third communication.

10. The smart device as recited in claim 1, wherein the first information in the second communication is encrypted.

11. The smart device as recited in claim 10, wherein the first information in the first communication is encrypted.

12. The smart device as recited in claim 1, wherein using the second information to configure a transmission system of the smart device to issue communications to the first device via the third communications link comprises configuring a remote control application resident on the smart device.

13. The smart device as recited in claim 12, wherein configuring the remote control application resident on the smart device includes selecting a command code set from a library of command code sets determined to be appropriate for the first device.

* * * * *